June 17, 1969  G. DZULA  3,449,833
APPARATUS FOR DETERMINING THE COORDINATES OF POINTS
Filed Jan. 25, 1967
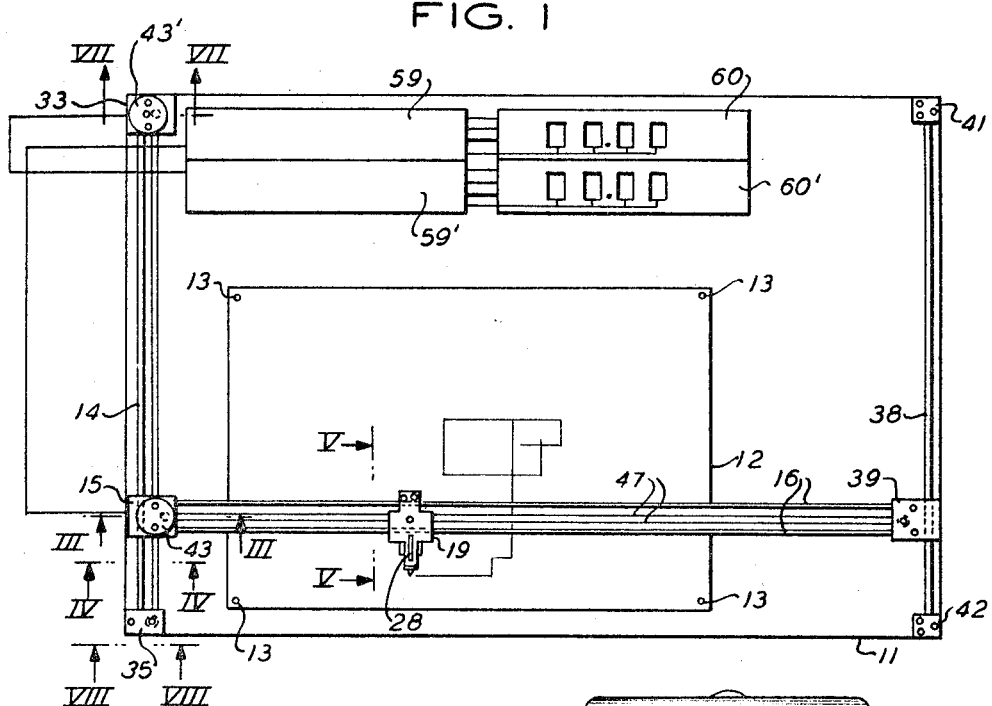
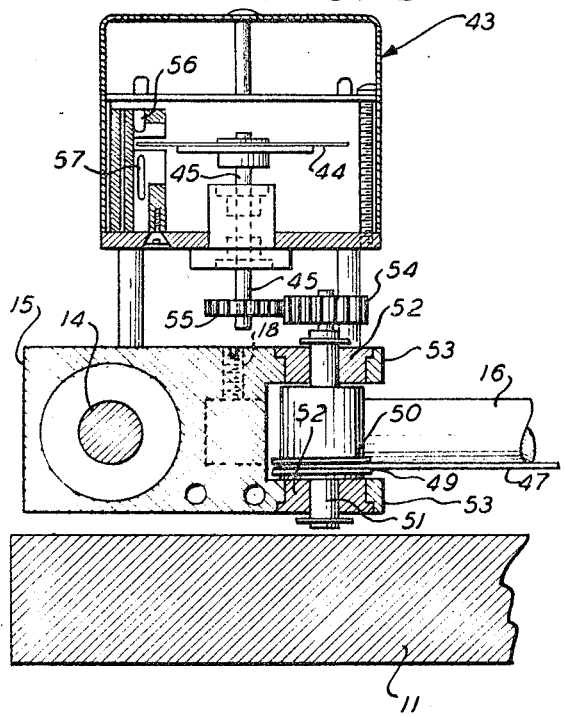
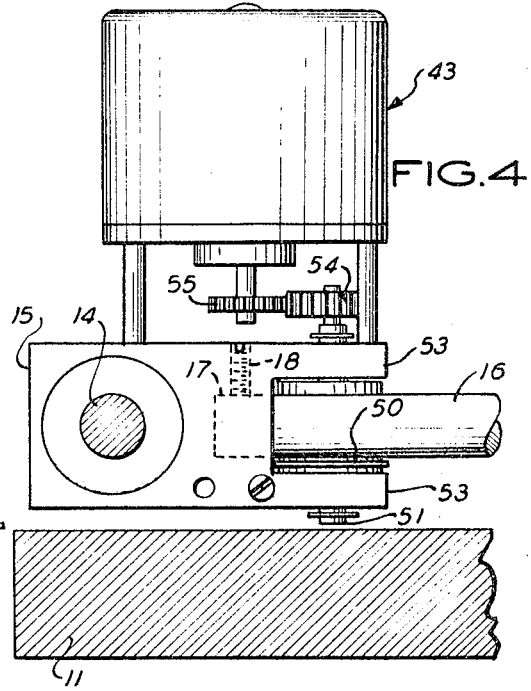
INVENTOR
GREGORY DZULA
BY Towson Price
ATTORNEY

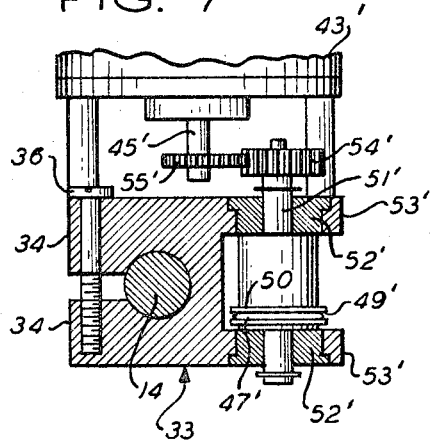
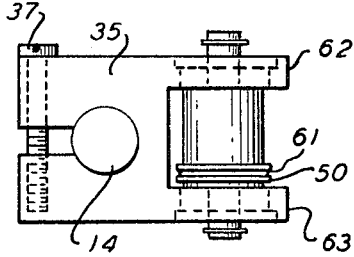
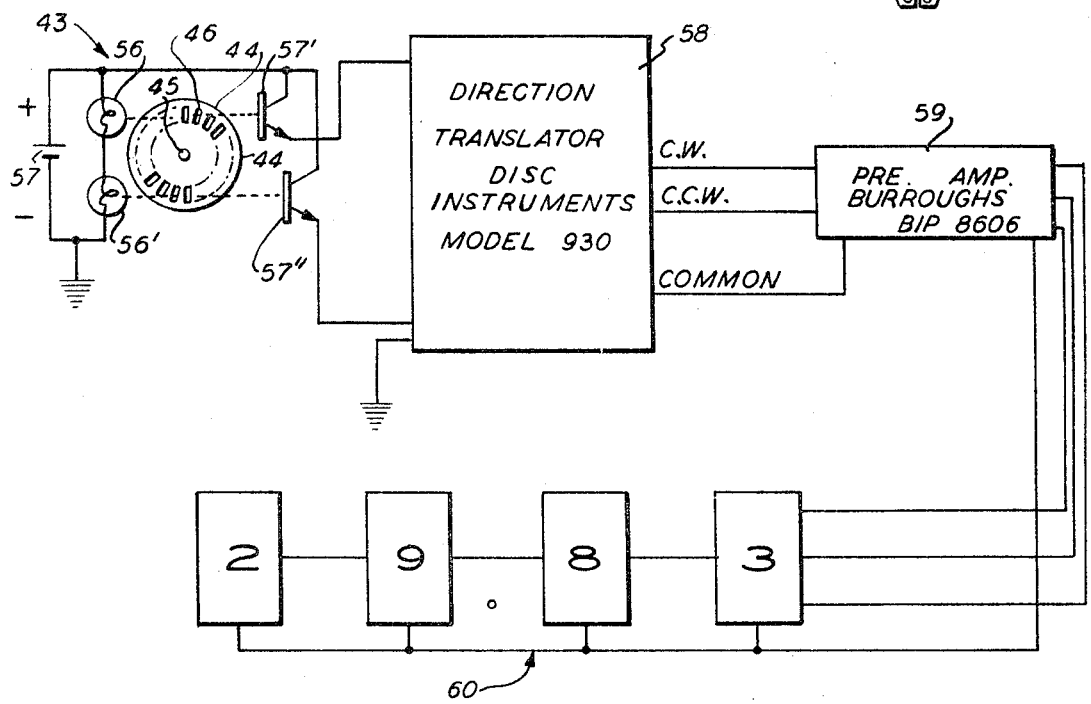

INVENTOR
GREGORY DZULA

BY Towson Price
ATTORNEY

United States Patent Office 3,449,833
Patented June 17, 1969

3,449,833
APPARATUS FOR DETERMINING THE COORDINATES OF POINTS
Gregory Dzula, 1 Fairview Drive,
North Caldwell, N.J. 07006
Filed Jan. 25, 1967, Ser. No. 611,613
Int. Cl. G06g 1/00
U.S. Cl. 33—1                                      10 Claims

ABSTRACT OF THE DISCLOSURE

Apparatus for obtaining in drafting and other operations, a digital readout of points on a two-dimensional graph, comprising a first shaft extending along a side of said graph, a second shaft with one end connected to ride along said first shaft, a scriber to travel over said graph and along said second shaft, a first bidirectional decade counter on which a reading increases or decreases as the scriber moves one way or the other along said second shaft, and a second bidirectional decade counter on which a reading increases or decreases as the second shaft rides one way or the other along the first shaft.

Background and objects of the invention

This invention relates to apparatus to give a digital readout of the X and Y coordinates of a point on a graph at which a carried scriber, such as a pen or pencil, registers.

The coordinates of a point on a two dimensional graph can be determined by a number of well-known graphical methods. Thus, the minimum and maximum points of a trace on a graphical record and the intersection of the trace with datum lines can be determined with a minimum of effort. So also can the position of points on a map be readily determined by the use of such well-known graphical techniques as intersection and resection.

While these methods of positioning a point posess a great degree of accuracy, they do not yield an absolute location of the point's position but rather yield, at best, a relative location of the point. This is not to say that the absolute location of such a point cannot be determined, in fact a variety of mathematical, algebraic and geometrical processes are known to the art. These processes, however, are dependent upon the mental operation of a skilled operator. Furthermore, such mental processes while not being extremely difficult are none the less time consuming.

Various mechanical devices, such as calibrated scales, have been suggested as a means of determining the absolute location of a point on a graph. Again, the operation of such mechanical devices is also time consuming and while they do not require a high degree of skill on the part of the operator necessary for the mental processes mentioned above, the results yielded by such devices are inherently more inaccurate than those of the mental processes. Moreover, the results obtained by such mechanical devices are subject to the interpretation of the operation.

Thus, the previous methods and techniques known in the art have failed to provide a simple and rapid means for determining the location of points on two dimensional graphs that do not require the mental assistance of a skilled operator.

An object of my invention is to provide a device which can be employed to rapidly and simply give a digital showing of the coordinates of points on a two dimensional graph, without the need of a skilled operator.

Another object of my invention is to provide a device of the character described wherein many of the parts are commercially available and may be bought and assembled without undue expense.

These and other objects and advantages will become apparent form the following detailed description when taken with the accompanying drawings. It will be understood that the drawings are for purposes of illustration and do not define the scope or limits of the invention, reference being had for the latter purpose to the appended claims.

Brief description of the drawings

In the drawings, wherein like reference characters denote like parts in the several views:

FIGURE 1 is a top plan view of apparatus embodying my invention.

FIGURE 2 is a diagrammatic plan view of part of the apparatus of FIGURE 1.

FIGURE 3 is a vertical sectional view on the line III—III of FIGURE 1, in the direction of the arrows and to a larger scale, the X-axis transducer carried on the illustrated bracket being shown in axial section.

FIGURE 4 is a vertical sectional view on the line IV—IV of FIGURE 1, in the direction of the arrows and to a larger scale, the carried X-axis transducer being shown in elevation.

FIGURE 7 is a vertical sectional view on the line VII—VII of FIGURE 1, in the direction of the arrows, and to a larger scale, the means connecting the bracket to the board (not shown) being omitted.

FIGURE 8 is a vertical sectional view on the line VIII—VIII of FIGURE 1, in the direction of the arrows and to the scale of FIGURE 7, the means connecting the bracket to the board (not shown) being omitted.

FIGURE 9 shows a Waldes retaining ring in elevation.

Description of a preferred embodiment

Figure 5:
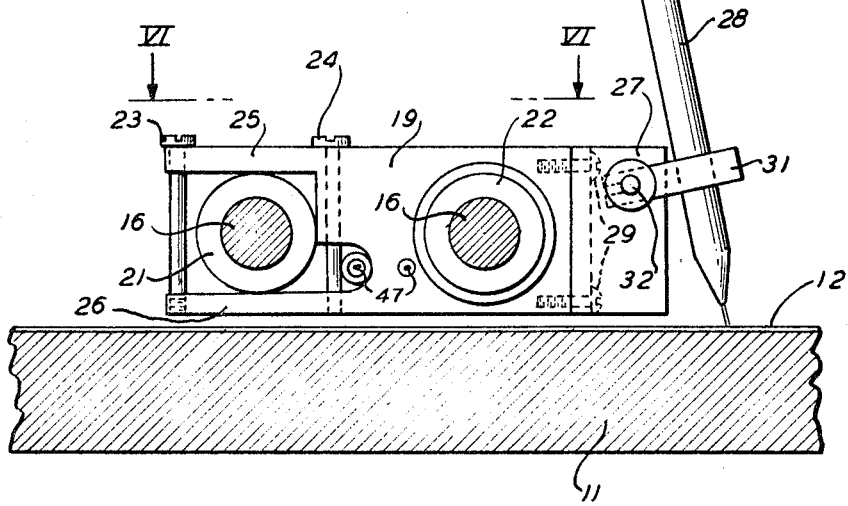
FIGURE 5 is a vertical sectional view on the line V—V of FIGURE 1, in the direction of the arrows and to a larger scale.

Referring to the drawings in detail, there is shown a table or drafting board 11 which may serve as a support for a two-dimensional graph or drawing 12, held in place by a suitable means such as thumb tacks 13. The apparatus supported on the board 11, which may be considered as an automatic drafting machine, is useful in the preparation of preliminary and detailed drawings from numerical data. As an alternative it will digitally show the coordinates of points on a graph.

Mounted over the board 11, parallel and secured thereto against turning by suitable means such as screw-secured brackets, is a first shaft 14 on which rides a first bracket 15. Said bracket 15 is apertured to freely receive the shaft 14 for travel thereon without misalignment, and, therefore, without unnecessary clearance, as shown in FIGURES 3 and 4. Second shaft means, desirably in the form of two shafts 16 parallel to one another and the board, extend from sockets 17 in the bracket 15 at right angles to the first shaft 14. The shafts 16 are desirably rigidly held in place in said sockets by suitable means, such as set screws 18, and thus cannot turn.

Figure 6:
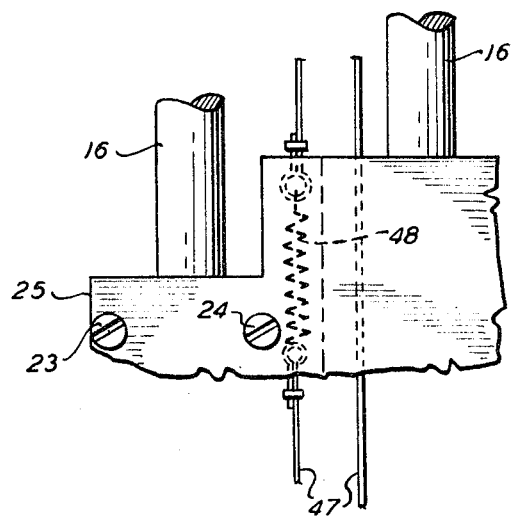
FIGURE 6 is fragmentary top plan view of part of the apparatus of FIGURE 5, as on the line VI—VI thereof, and to the same scale.

A second bracket 19 has bearing members 21 and 22 apertured to freely receive the shafts 16 without unnecessary clearance for travel therealong without misalignment, as shown in FIGURES 1, 5 and 6. The bracket 19 may have the bearing 22 immovable transversely of the shafts 16, while the other bearing 21 is desirably transversly adjustable with respect to the bearing 22, before being frictionally held in place. Such holding may be effected by tightening bolts 23 and 24 to pull the bifurcations 25 and 26 of the second bracket 19 into holding engagement with the bearing 21, after the latter is in adjusted position.

There is a holder 27 for a scriber, such as a pen or pencil 28, secured to the bracket 19 by suitable means such as screws 29. Said scriber is desirably held in a yoke 31 pivoted to the holder 27 as indicated at 32, so as to apply a desired pressure on an engaged point of the graph 12.

The first shaft 14 is supported at one end by a third bracket 33 with bifurcation 34, which may be drawn into gripping engagement with said shaft by a set screw 36, as illustrated in FIGURE 7. The bracket 33 is secured to the board 11 by suitable means such as screws, not shown. Said shaft 14 is supported at its other end by a fourth bracket 35 as illustrated in FIGURE 8. The bracket 35, like the bracket 33, is caused to grip the shaft 14 by a set screw here designated 37. Said bracket 35 is secured to the board 11 like the bracket 33.

There is desirably provided a third shaft 38 attached, generally parallel to, and extending along the other side of, the board 11 parallel to the first shaft 14. The right hand end of the second shaft means 16 carries a fifth bracket 39 which rides on the third shaft 38, like the first bracket 15 rides on the first shaft 14. The ends of the third shaft 38 are desirably respectively secured in sixth and seventh brackets 41 and 42, like the ends of the first shaft 14 are respectively secured in the third and fourth brackets 33 and 35. The brackets 41 and 42 are desirably secured to the board 11 like the brackets 33 and 35 and of generally similar construction.

Mounted on the first bracket 15 is an X-axis transducer 43, as shown in FIGURES 1, 2, 3 and 4. This transducer is desirably one of the photoelectric type, such as a direction-sensitive Model 830 Rota-switch Pulser with a disc 44, shown as an example in FIGURE 3, carrier on a suitably journalled shaft 45. This disc has a series of slots 46 and the photocells 57' and 57" are phased 90° apart for direction determination. See Bulletin 10, May 1964, of Disc Instruments, Inc., 3014–B S. Halladay St. Santa Ana, Calif. 92705, especially the showing of the "Photoelectric Type," FIGURE 7 and the data for Model 830.

Means are provided for connecting the second bracket 19 to the shaft 45 of the transducer 43 to cause turning of said shaft in accordance with movement of the bracket along said second shaft means 16. These connecting means here take the form of a cord or cable 47, which is connected to the second bracket 19 by suitable means, which may be bolt 24. The cable 47 held under tension as by a coil spring 48, passes around an enlarged portion 49 of the shaft 51 rotatably carried in bearings 52 in upper and lower bifurcations 53 of the first bracket 15.

The enlarged portion 49 is ground to a critical exact size and the cable 47 held in place between two Waldes retaining rings 50 fitted in properly-spaced grooves in said shaft, forming a pulley-acting portion simpler than a separate pulley. See FIGURE 9.

The upper end portion of the shaft 51 has a gear 54 fixed thereon and meshing with a gear 55 fixed on the lower end portion of the shaft 45. The cable 47 also passes around an idler pulley (not shown) which may be similarly constructed and suitably journalled in the fifth bracket 39. Thus movement of the second bracket 19 along the second shaft 16 effects corresponding turning of disc 44.

Rotation of the slotted disc 44 varies the intensity of light from lamps 56 and 56' powered by suitable means such as a battery 57. This light falls on photosensitive detectors or photocells 57' and 57" as out-of-phase wave forms. A change in direction of rotation, as the direction of movement of the second bracket 19 changes, correspondingly changes the output signal from the detectors 57' and 57" to the direction translator 58.

The pulses from the transducer 43 enter the translator 58, which by its internal logic determines the direction of rotation. Pulses will appear on the C.W. line only when the transducer shaft 45 is turned clockwise and on the C.C.W. line only for counterclockwise rotation. The number of pulses is determined by the amount of shaft rotation. The translator 58 may also multiply the number of pulses from the transducer 43.

By varying cable pulley diameter, gear ratios and/or number of slits in transducer disc 44 it is possible to obtain many combinations of number of pulses per unit of lineal motion of scriber. The number of pulses may also be altered by dividing or multiplying circuits.

The pulses on the lines marked C.W. and C.C.W. enter the preamplifier 59, which provides the bias voltage to set the digits of its decade counters 60 for adding or subtracting. Clockwise rotation can be made to cause the counters to add and counterclockwise rotation can be made to cause them to subtract. The counters can be set to zero at any location, in effect giving a floating zero.

The foregoing applies particularly to mechanism for showing the X-axis coordinate of the point under consideration on the decade counters 60', using the mechanism of FIGURES 1 to 6, inclusive. The Y-axis coordinate is shown on the decade counters 60' controlled by movement of the first bracket 15 along the shaft 14, and connected to the Y-axis transducer 43', like the second bracket 19 is connected to the transducer 43, and mounted on the third bracket 33 in a manner similar to the mounting of the X-axis transducer on the first bracket 15, as shown in FIGURES 1 and 7. As in connection with the transducer 43, the Y-axis transducer 43' has a disc, not shown, but like the disc 44 and carried on a suitably-journalled shaft 45'.

The means for connecting the first bracket 15 to the shaft 45' here comprises a cord or cable 47' connected to said first bracket 15 by suitable means, which may be like the connection of the cable 47 to the second bracket 19, as shown in FIGURE 6, including a tensioning coil spring like the spring 48 but not shown. The cable 47' passes around an enlarged portion 49' of the shaft 51' rotatably carried in bearings 52' in upper and lower bifurcations 53' of the third bracket 33. The enlarged portion 49' is grooved and fitted with two Waldes retaining rings, between which the cable 47' fits, to form a pulley-acting portion like that designated 49 in FIGURE 3. The upper end portion of the shaft 51' has a gear 54' fixed thereon and meshing with a gear 55' fixed on the lower end portion of the shaft 45'.

The cable 47' also passes around an idler pulley 61, which may be similarly constructed and journalled between bifurcations 62 and 63 of the fourth bracket 35, as illustrated in FIGURES 1 and 8. Thus movement of the first bracket along the first shaft effects corresponding turning of the discs of the transducer 43'. Rotation of the Y-axis transducer discs has the same effect on the preamplifier 59' and decade counter 60' as rotation of the X-axis transducer discs has on the preamplifier 59 and the decade counter 60. In this way, both of the X-axis and Y-axis coordinates are determined.

Having now described my invention in detail in accordance with the requirements of the Patent Satutes, those skilled in this art will have no difficulty in making changes or modifications in the individual parts or their relative assembly in order to meet specific requirements or conditions.

I claim:

1. Apparatus for determining the coordinates of points on a two-dimensional graph comprising, a first nonturning shaft, a first manually movable bracket mounted to ride along said shaft, second nonturning shaft means extending from said bracket, generally perpendicular to said first shaft, a second manually movable bracket mounted to ride along said second shaft means, a holder carried by said second bracket for a scriber to engage a point on said graph when disposed therebeneath, an X-axis transducer carried by the first bracket, third and fourth brackets mounted on and carrying opposite end portions of said first shaft, a Y-axis transducer carried by the third bracket, means connecting the second bracket to the X-axis transducer to cause turning of an operating shaft thereof in accordance with movement of said bracket along said second shaft means, means connecting the first bracket to the Y-axis transducer to cause turning of an operating shaft thereof in accordance with movement of said first bracket along said first shaft, and means connecting output circuits from said transducers through direction-translators and preamplifiers to first and second bidirectional decade counters, to digitally show the respective X and Y pocsitions of the scriber on the graph.

2. Apparatus as defined in claim 1, wherein the graph is supported on a board, the first shaft is attached parallel to and extends along one side of said board, and the second shaft means extends parallel to and across the board.

3. Apparatus as defined in claim 1, wherein the X-axis transducer is direction-sensitive, has two photocells and comprises a shaft-carried disc with a series of slote and the photocells are phased 90° apart to determine the direction of rotation in the direction translator, said second bracket being connected through cable, pulley and gears to the disc shaft, so that said disc turns in one direction or the other as the scriber is moved to right or left.

4. Apparatus as defined in claim 1, wherein the Y-axis transducer is direction-sensitive, has two photocells and comprises a shaft-carried disc with a series of slots and the photocells are phased 90° apart to determine the direction of rotation in the direction translator, said first bracket being connected through cable, pulley and gears to the disc shaft, so that said disc turns in one direction or the other as the first bracket is moved one way or the other along the first shaft.

5. Apparatus as defined in claim 1, wherein each transducer is direction-sensitive, has two photocells and consists of a disc with a series of slots and the photocells are phased 90° apart to determined the direction of rotation in the direction translator.

6. Apparatus for determining the coordinates of points on a two-dimensional graph comprising, a board for supporting the graph, a first shaft nonrotatably attached, generally parallel to, and extending along one side of said board, a first bracket mounted to ride along said shaft, nonturning second shaft means extending from said bracket, generally perpendicular to said first shaft, across and parallel to said board, a second bracket mounted to ride along said second shaft means, a holder carried by said second bracket for a scriber to engage a point on said graph, a photoelectric direction-sensitive transducer with a shaft-carried disc with a series of slots and two photocells phased 90° apart for direction determination on the X-axis and carried by the first bracket, a third bracket mounted on and carrying one end portion of the first shaft, a similar transducer with a similar disc for the Y-axis and carried by the third bracket, a fourth bracket mounted on and carrying the other end portion of said first shaft, a third shaft attached, parallel to and extending along the other side of said board, a fifth bracket, to which the other end of the second shaft means is connected, mounted to rid along said third shaft, means connected the second bracket to the X-axis transducer to cause turning of an operating shaft thereof in accordance with movement of said bracket along said second shaft means, means connecting the first bracket to the Y-axis transducer to cause turning of an operating shaft thereof in accordance with movement of said first bracket along said first shaft, and means connecting output circuits from each of said transducers through direction-translators, and preamplifiers, to decade counters each of which is one of a bidirectional type to digitally show the position of the scriber on the graph.

7. Apparatus as defined in claim 1, wherein the means connecting the second bracket to the X-axis transducer comprises a cable held under tension and connected to a first normally vertical shaft, a first gear secured to the upper end portion of said shaft, said transducer comprising a second normally vertical shaft, and a second gear carried on the lower end portion of said second shaft and meshing with said first gear.

8. Apparatus as defined in claim 1, wherein the means connecting the first bracket to the Y-axis transducer comprises a cable held under tension and connected to a first normally vertical shaft, a first gear secured to the upper end portion of said shaft, said transducer comprising a second normally vertical shaft, and a second gear carried on the lower end portion of said second shaft and meshing with said first gear.

9. Apparatus as defined in claim 6, wherein the means connecting the second bracket to the X-axis transducer comprises a cable held under tension and connected to a first normally vertical shaft, a first gear secured to the upper end portion of said shaft, said transducer comprising a second normally vertical shaft, and a second gear carried on the lower end portion of said second shaft and meshing with said first gear.

10. Apparatus as defined in claim 6, wherein the means connecting the first bracket to the Y-axis transduced comprises a cable held under tension and connected to a first normally vertical shaft, a first gear secured to the upper end portion of said shaft, said transducer comprising a second normally vertical shaft, and a second gear carried on the lower end portion of said second shaft and meshing with said first gear.

References Cited
UNITED STATES PATENTS

| | | | |
|---|---|---|---|
| 2,353,726 | 7/1944 | Guttmann | 33—189 X |
| 2,788,519 | 4/1957 | Caldwell. | |
| 2,873,535 | 2/1959 | Gordon et al. | 33—189 |
| 2,944,157 | 7/1960 | McAuslan et al. | 250—233 |
| 3,059,236 | 10/1962 | Marantette et al. | |
| 3,111,841 | 11/1963 | Gray | 250—233 X |
| 3,166,844 | 1/1965 | Pascoe et al. | |
| 3,212,194 | 10/1965 | Brault | 33—189 |

WILLIAM D. MARTIN, JR., *Primary Examiner.*

U.S. Cl. X.R.

33—125